United States Patent [19]

Thomas et al.

[11] Patent Number: 5,016,790
[45] Date of Patent: May 21, 1991

[54] APPARATUS AND METHOD FOR DISPENSING A DETERGENT SOLUTION

[75] Inventors: John E. Thomas, River Falls, Wis.; Darrell Saby, Minneapolis, Minn.; Richard Mehus, Bershire, United Kingdom

[73] Assignee: Ecolab Inc., St. Paul, Minn.

[21] Appl. No.: 453,078

[22] Filed: Dec. 19, 1989

Related U.S. Application Data

[63] Continuation of Ser. No. 272,546, Nov. 17, 1988, abandoned, which is a continuation of Ser. No. 80,208, Jul. 30, 1987, abandoned, which is a continuation of Ser. No. 768,870, Aug. 23, 1985, abandoned.

[51] Int. Cl.⁵ .............................................. B67D 5/08
[52] U.S. Cl. ................................. 222/639; 222/651; 251/54; 422/261; 422/266
[58] Field of Search .................................. 422/264, 266

[56] References Cited

U.S. PATENT DOCUMENTS

| | | | |
|---|---|---|---|
| Re. 32,763 | 10/1988 | Fernholz et al. | 422/264 X |
| Re. 32,818 | 1/1989 | Fernholz et al. | 422/264 X |
| 1,108,276 | 8/1914 | Tetlow | 251/54 |
| 1,560,439 | 11/1925 | Trenor | 251/54 |
| 1,580,494 | 4/1926 | Jones | 252/54 |
| 1,722,155 | 7/1929 | Myer | 251/54 |
| 1,995,331 | 3/1935 | Snyder et al. | 141/9 |
| 2,155,254 | 4/1939 | Clark | 141/9 |
| 2,669,999 | 2/1954 | McMillan | 134/101 |
| 3,177,894 | 4/1965 | Camp | 251/54 X |
| 3,243,155 | 3/1966 | Valente | 251/54 |
| 3,301,486 | 1/1967 | Brook | 222/639 X |
| 3,402,853 | 9/1968 | Perl | 222/651 |
| 3,727,889 | 4/1973 | Nagel | 442/261 X |
| 3,762,278 | 10/1973 | Strizhenko et al. | 251/54 X |
| 3,933,337 | 1/1976 | Morris et al. | 251/54 |
| 4,753,781 | 6/1988 | Cassady, Jr. et al. | 422/264 |

FOREIGN PATENT DOCUMENTS 581109 9/1924 France .

*Primary Examiner*—Andres Kashnikow
*Assistant Examiner*—Gregory L. Huson
*Attorney, Agent, or Firm*—Merchant Gould Smith Edell Welter & Schmidt

[57] ABSTRACT

An apparatus for dispensing a liquid detergent solution using a timing fluid is disclosed. A preferred cleaning system (10) includes a fluid-operated solvent metering apparatus (38). The metering apparatus (38) preferably includes a normally-closed valve (16) and a timing device (40). The timing device (40) preferably includes a cylinder (52) and a piston (54), wherein the piston (54) forms a pair of subchambers (56, 58) which are interconnected by a flow control device (68). The flow control device (68) serves to restrict the flow of a timing fluid from one subchamber (56) to the other subchamber (58) so as to hold the valve (16) in its open position for a period of timing following its initial manual opening. A return spring (48) in the normally closed valve (16) urges the valve (16) toward its closed position, and the spring (48) also acts against the piston (54) to cause the timing fluid to flow from the first subchamber (56) to the second subchamber (58). A water source 12 and a detergent source 14 are in fluid communication for the period of time that the valve (16) is held open.

18 Claims, 1 Drawing Sheet

APPARATUS AND METHOD FOR DISPENSING A DETERGENT SOLUTION

This is a continuation of application Ser. No. 272,546 filed Nov. 17, 1988, which is a continuation of Ser. No. 080,208, filed July 30, 1987, which is a continuation of Ser. No. 768,870, filed Aug. 23, 1985, all now abandoned.

FIELD OF THE INVENTION

The invention relates generally to dispensers for liquid cleaning solutions, and more particularly to methods and means for precisely producing a predetermined amount of liquid detergent solution.

BACKGROUND OF THE INVENTION

Chemical cleaning compounds have long been advantageously used in a variety of contexts. Such compounds are produced in solid, granulated or powdered, and liquid forms. Typically, a cleaning compound is mixed with a solvent (e.g., water) to form a cleaning solution. The present invention is broadly directed to methods and apparatus for precisely mixing a solvent and a detergent to form a liquid detergent solution.

One particularly popular class of chemical cleaning compounds is produced in solid, granulated or powdered form and is mixed with a solvent, carrier or dispersent prior to use. For ease of discussion, the term solid is defined herein to include the terms granulated and powdered. This is justified since all three forms or states include a solid chemical cleaning compound. The present discussion is directed primarily to dispensing cleaning solutions made from solid detergents. However, the present invention is not in any way limited to solid detergent applications.

In addition, the following description will refer to the liquid which is mixed with the solid as a solvent, though the invention is not limited to dispensing "solutions" in the strict sense of the word. Mixtures, slurries, suspensions and the like are also contemplated. Since water is a very common solvent, the following discussion will be directed primarily to methods and apparatus for mixing water with a solid detergent to form a liquid detergent solution.

One very common use for detergent solutions formed from solid detergent dissolved in water is for dishwashing, and this example will be used to describe the prior art and preferred embodiments of the present invention. It should be emphasized that the present invention is not limited to dishwashing applications, however. In dishwashing applications, the liquid cleaning or detergent solution, a solution in which the concentration of detergent is quite high, is typically mixed with water in a sink in which dishes are washed. It has long been recognized that an optimum ratio of liquid detergent solution to water exists. Choosing the "optimum" ratio involves a consideration of factors such as the cost of the cleaner, the temperature of the water, and the "soil load" of the dishes to be washed.

Still focusing on the dishwashing example, one method by which an optimum ratio of water to liquid detergent solution can be achieved is by precisely measuring the water within the sink and adding to the water the appropriate amount of liquid cleaning solution. One way to ensure that the appropriate amount of cleaning solution has been added to the sink is to allow the liquid cleaning solution to flow to the sink for a predetermined period of time. The present invention is particularly directed to a method and means for metering, dispensing or producing a precise amount of liquid detergent solution by opening a valve between a pressurized water source and a solid cleaning compound for a precise predetermined length of time.

It is perceived that one very desirable characteristic of such a cleaning solution dispensing system is that it be self-contained. That is, it is very desirable that the dispensing system not require connection to a central source of power, e.g., line voltage supplied by an electrical utility. Self-containment provides for a simpler installation, making for a less expensive cleaning solution dispenser. For example, if a dispensing system does not require connection to line voltage, the installation need not be done by an experienced electrician. Furthermore, self-containment results in a dispensing system that is more fool-proof. In addition, if the dispensing system is self-contained there is one fewer connection that is subject to failure and the system can more thoroughly be checked at the factory prior to installation in the field. Additionally, surge suppressers and the like need not be included in the system to filter line surges since the system is internally powered and controlled.

It is also desirable that the liquid detergent solution producing apparatus be inexpensive. In many cases the liquid detergent solution producing apparatus is used in conjunction with a fairly small dishwashing system and high cost must be avoided.

Another desirable characteristic of such a cleaning solution dispensing system is that it be accurate and precise. If too much liquid cleaning solution is delivered to a cleaning station (e.g., a sink), excessive foaming can result, cleaning solution is effectively wasted, and cleaning efficiency is not proportionally increased. If, on the other hand, too little cleaning solution is dispensed, cleaning efficiency suffers and energy is wasted since multiple cleanings may be needed.

Still another attribute of a preferred liquid cleaning solution dispenser is simplicity, to minimize cost and increase the mean time between failures.

The prior art does not disclose a liquid detergent dispensing system having all of the attributes discussed above. One fairly standard cleaner dispensing system includes a spring-loaded normally-closed solenoid-operated valve that requires continuous electrical power during the period of time that the valve is held open to dispense the liquid cleaning solution. This type of valve naturally requires a comparatively large amount of energy and makes self-containment essentially unachievable. Other electrical control systems have been contemplated, but in many cases such systems are prohibitively complex and costly. Further, very often such systems are too delicate for rugged industrial applications.

In view of these potential problems with electrical control systems, the present invention is directed to a fluid-operated system. The present invention uses a timing fluid (e.g., paraffin or mineral oil) to control the rate of closure of a normally closed valve that has typically been manually opened Such a system can be self-contained; inexpensive; simple; and essentially fool-proof. Therefore, it is perceived that the present invention is directed to and solves many of the problems addressed above.

As noted above, the present invention provides for a detergent solution dispensing system that can be completely self-contained. Preferred systems constructed according to principles of the present invention are thus relatively simple to install and need not have built-in filters or the like to guard against transient behavior in central power supplies. Additionally, apparatus of the present invention can be easily and safely installed without requiring the services of an electrician. Systems according to the present invention can be easily installed in locations where central power is not conveniently accessible. Furthermore, preferred apparatus, being self-contained, are not limited to a particular line voltage or solvent pressure, and can therefore be installed domestically without including means for accommodating local voltage variations, and internationally with no modifications to account for the varying line characteristics worldwide.

SUMMARY OF THE INVENTION

Accordingly, the present invention includes apparatus and methods for utilizing a timing fluid to produce or dispense a predetermined amount of liquid detergent solution. An apparatus of the present invention includes a valve; a timing device including a chamber and a movable element within the chamber dividing the chamber into a first subchamber and a second subchamber, the movable element having a first state and a second state; and means for urging the movable element from its second state toward its first state. The movable element of the timing device is operatively connected to the valve and its motion is affected by the timing fluid. The timing fluid is contained within the subchambers and flows between the subchambers during the operation of the apparatus. In particular, there is provided means in fluid communication with the subchambers for enabling movement of the movable element by permitting the flow of timing fluid between the subchambers.

The movable element is connected to the valve wherein when the movable element is in its first state the valve is closed and when the movable element is in its second state the valve is open.

When the timing device is activated by moving the movable element from its first state to its second state the valve is opened. The urging means causes the movable element to move from its second state to its first state during a predetermined period of time, wherein the valve is open for the predetermined period of time, and the period of time is affected by the rate of flow of timing fluid from the first subchamber to the second subchamber. A higher rate of flow of timing fluid is associated with a shorter predetermined period of time and a lower rate of flow is associated with a longer predetermined period of time.

The enabling means in fluid communication with the subchambers preferably includes an orifice in parallel with a check valve, wherein the check valve freely permits flow of timing fluid from the second subchamber to the first subchamber and substantially permits flow of timing fluid from the first subchamber to the second subchamber. The orifice in parallel with the check valve provides for a restricted flow path from the first subchamber to the second subchamber. The orifice is preferably adjustable so that the predetermined period of time during which the valve is open can be adjusted.

The chamber which houses the movable element is preferably a cylinder and the movable element is preferably a piston slidably contained within the cylinder. The piston preferably carries a rod which actuates the valve.

Also, preferred embodiments of the apparatus of the present invention include a normally-closed valve which includes a return spring. The return spring of the valve can serve as the means for urging the movable element, or piston, from its second state toward its first state.

Another embodiment of the apparatus of the present invention includes a solvent supply and a detergent supply with the valve and timing device interposed therebetween.

The invention also includes a method for dispensing or producing a liquid detergent solution. The method includes selecting a solvent supply; selecting a detergent supply; and selecting a normally-closed valve and placing it in fluid communication with and between the solvent supply and the detergent supply; selecting a chamber suitable for containing a timing fluid; dividing the chamber into two subchambers using a movable element sealingly engaged with the chamber, the movable element having a first state and a second state; permitting timing fluid to freely flow from the second subchamber to the first subchamber while restricting its flow from the first subchamber to the second subchamber; operatively connecting the valve and the movable element, wherein When the movable element is in its first state the valve is closed and when the movable element is in a second state the valve is open; continuously urging the movable element from its second state toward its first state; and moving the movable element from its first state to its second state, wherein the movable element will subsequently move from its second state to its first state over a predetermined period of time, wherein the predetermined period of time results from the restriction of the flow of timing fluid from the first subchamber to the second subchamber, whereby the valve is open for a predetermined period of time, whereby the solvent supply and the detergent supply are in fluid communication for the predetermined period of time, and whereby the predetermined amount of liquid cleaning solution can be dispensed.

DETAILED DESCRIPTION OF PREFERRED EMBODIMENTS

Figure 1:
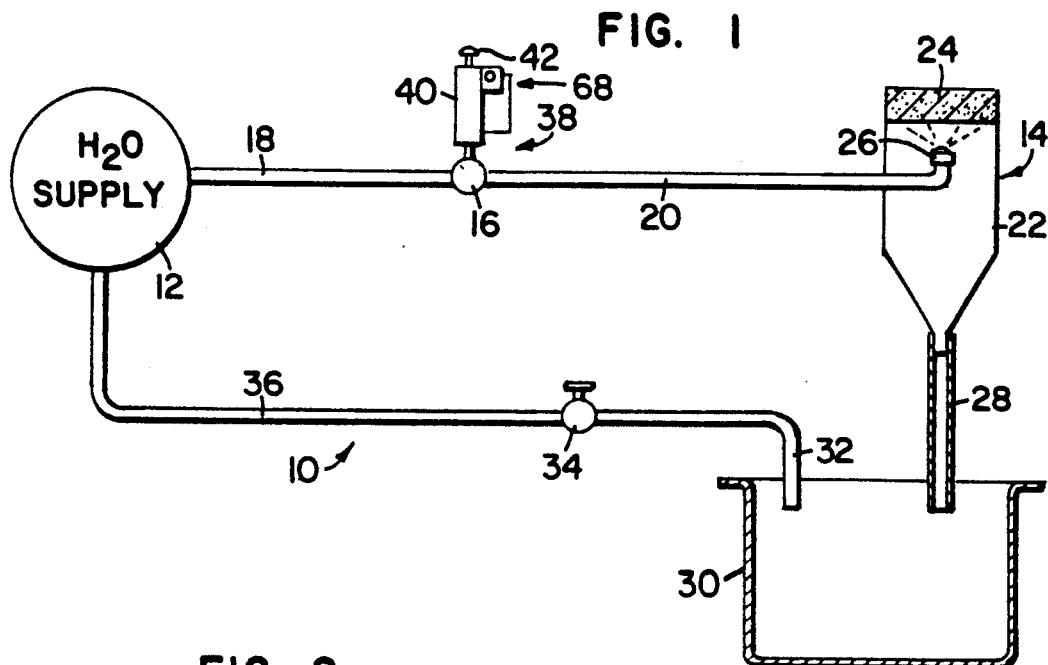
FIG. 1 is a schematic view of a cleaning system of the present invention including a solvent metering apparatus having a normally-closed valve.

Referring to the Drawing, wherein like reference numerals represent like parts and assemblies throughout the several views, FIG. 1 shows a schematic view of a cleaning system 10 which includes a water supply 12 and a solid detergent supply 14. Between and in fluid communication with the water supply 12 and the detergent dispenser or supply 14 is a normally-closed valve 16. The water supply 12 is preferably a pressurized source of water, wherein when the valve 16 is open water can flow from the water supply 12 to the detergent supply 14. An incoming metering water line 18 interconnects water supply 12 and normally-closed valve 16. Similarly, outgoing metering water line 20 carries water from the valve 16 to the detergent supply 14. It should again be noted that the liquid solvent which is mixed with the detergent need not necessarily be water. Similarly, any detergent or cleaning compound in any form could be mixed with the solvent. For example, the valve 16 could control the flow of water to an aspirator which draws in a liquid detergent and mixes it with the water producing the vacuum.

The solid detergent supply 14 preferably includes a canister 22 which contains a source of solid detergent. As FIG. 1 illustrates, the supply of solid detergent can be in the form of a detergent cake 24 located toward the top of the canister 22. The outgoing metering water line 20 preferably terminates with a spray nozzle 26 located within the canister 22. The spray nozzle 26 is aimed toward the detergent cake 24 such that when a water spray issues from the nozzle 26 it impinges and dissolves a portion of the cake 24. The resulting liquid detergent solution flows downward through the canister 22 and out through a liquid detergent spout 28. The spout empties into a sink 30 wherein the liquid detergent solution is mixed with water in appropriate proportions. Reference is made to U.S Pat. Nos. 4,063,663 and 4,426,362, incorporated herein by reference. They describe powdered and solid block detergent dispensers, respectively, which could be used as the supply 14 shown schematically in FIG. 1.

Water suitable for mixing with the liquid detergent solution is supplied to the sink 30 through a water spout 32 which is in fluid communication with a main water valve 34. The valve 34 is connected to the water supply 12 by a main water line 36.

As described above, the normally closed valve 16 controls the flow of water from the water supply 12 to the detergent supply 14. The valve 16 is preferably one component of a solvent metering apparatus 38. The metering apparatus 38 also includes a timing device 40 which can be actuated to open the normally-closed valve 16 for a predetermined period of time to meter a predetermined amount of water from the water supply 12 to the detergent supply 14. Preferably the timing device 40 includes a push button 42 which can be manually pushed to actuate the timing device 40. Of course, the timing device 40 could alternatively be automatically actuated, e.g., in response to a "low detergent" signal from a sensor in contact with the contents of sink 30.

Figures 2, 3:
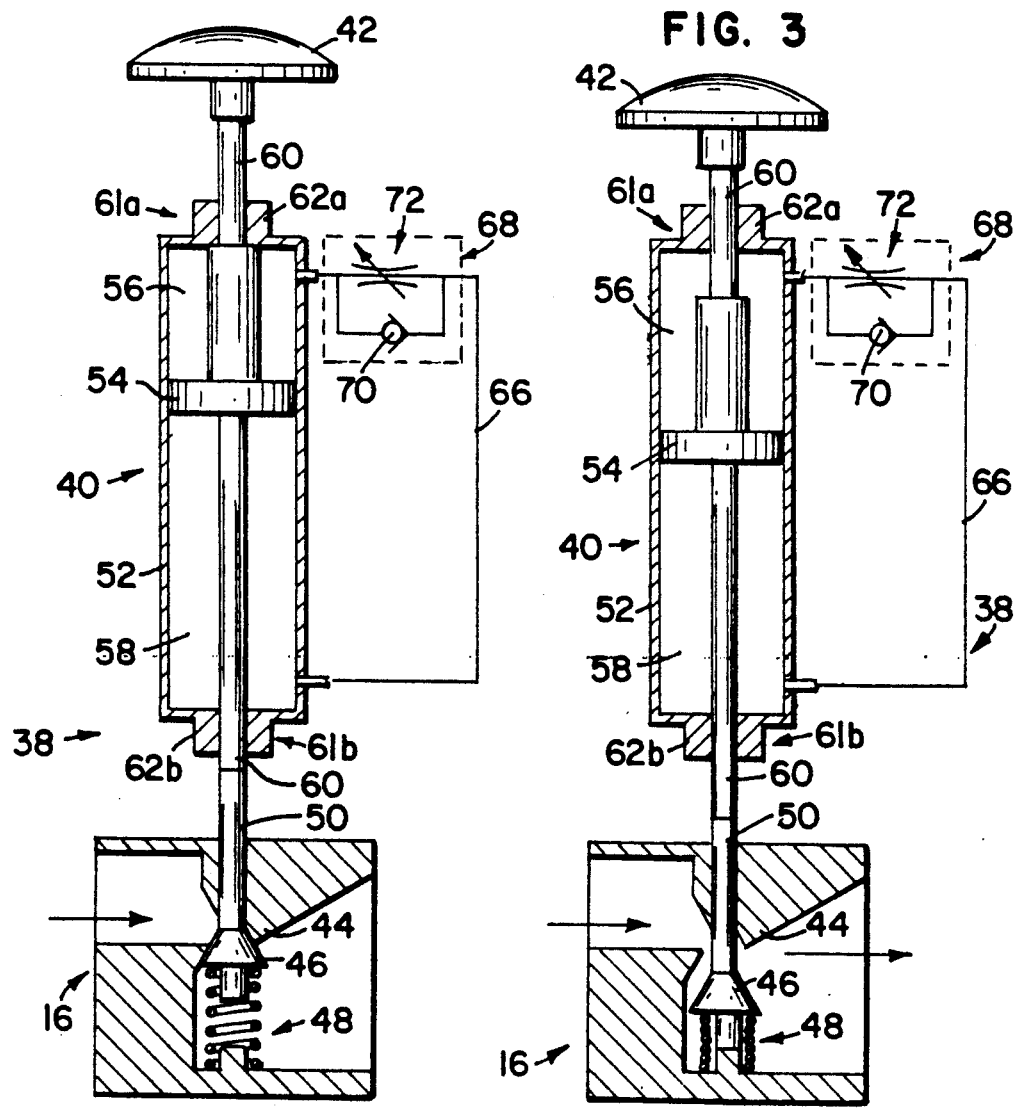
FIG. 2 is an enlarged schematic view of the solvent metering apparatus of FIG. 1, showing the normally-closed valve in its closed state.
FIG. 3 is an enlarged schematic view of the solvent metering apparatus of FIG. 1, showing the normally-closed valve in its open state.

FIG. 2 shows an enlarged schematic view of the solvent metering apparatus 38. As discussed above, the solvent metering apparatus 38 includes the normally-closed valve 16 and the timing device 40. The normally-closed valve 16 is preferably a standard normally-closed valve which includes a return spring or the like suitable for urging the valve into its closed state. The valve should of course include internal components which are compatible with the particular solvent being metered. For water, a model No. 151 normally-closed two-way valve manufactured by Milton Industries of Chicago, Ill. has been found to be preferable. It should particularly be noted that the normally closed valve 16 is shown in the Drawing in very schematic form and that any suitable normally-closed valve can be used.

A normally-closed valve is shown in schematic in FIGS. 2 and 3, and no attempt has been made to accurately depict the Milton Industrial valve mentioned above. The valve 16 includes a valve seat 44 and a valve plug 46 which moves relative to and seals against the valve seat 44. A valve return spring 48 urges the valve plug 46 from its open position, shown in FIG. 3, toward its closed position in sealing engagement with the valve seat 44, shown in FIG. 2.

The normally closed valve 16 also preferably includes a valve stem 50 which extends outside of the body of the valve. The valve stem 50 carries the plug 46 such that when the valve stem 50 is moved the valve plug 46 also moves. Appropriate actuation of the valve stem 50 causes the plug 46 to disengage from the valve seat 44 to open the valve 16, as illustrated in FIG. 3. Once the valve stem 50 is released, the spring 48 causes the plug 46 to return to its normal closed position, shown in FIG. 2.

The solvent metering apparatus 38 also includes the timing device 40. In its preferred form, the timing device 40 includes a cylinder 52 which forms an internal chamber suitable for containing a "timing fluid" such as paraffin oil or mineral oil. Other fluids could be used, including water, but viscous oil has been found to be preferable. The cylinder 52 also slidably receives a double-sided piston 54 which divides the cylinder 52 into a first subchamber 56 and a second subchamber 58. The piston carries a centrally located rod 60 which axially extends through both end caps 61 of cylinder 52. A first rod seal 62a allows for sliding movement of the rod 60 at one end of the cylinder 52 while a second rod seal 62b serves the same function at the opposite end of the cylinder 52. The rod seals 62 are preferably quad-ring seals but could also be U-cup seals or the like. In general, the cylinder 52 and piston 54 are preferably of standard construction. U-cup seals or the like are also included on the piston 54 as well. One supplier for such cylinder piston combinations is American Cylinder Company of Chicago, Ill.

The rod 60 at its end proximate the first rod seal 62a terminates with the push button 42. The opposite end of the rod 60 terminates adjacent to the axially-aligned valve stem 50 of normally closed valve 16.

A by-pass line 66 interconnects the first and second subchambers 56 and 58. A flow control device 68 is located in the by-pass line 66. The flow control device 68 preferably provides a direction-sensitive resistance to the flow of timing fluid through the by-pass line 66 such that the flow through the by-pass line 66 is faced with less resistance when going from the second subchamber 58 to the first subchamber 56 than when the flow is from the first subchamber 56 to the second subchamber 58.

Accordingly, a preferred embodiment of the flow control device 68 preferably includes a check valve 70 in parallel with an adjustable orifice 72. Thus, it can readily be seen that flow can proceed much more readily from the second subchamber 58 to the first subchamber 56 than vice versa.

The adjustable orifice 72 substantially controls the rate of flow of timing fluid from the first subchamber to the second subchamber. The adjustable orifice 72 is preferably substantially "linear" over a preferred range such that when an adjustment screw (not shown), on the orifice 72 is rotated a set number of degrees this corresponds to a particular change in the orifice's resistance to flow regardless of the starting or ending point. The adjustable orifice 72 and the check valve 70 are preferably of standard construction and can be purchased from any of a large number of suppliers of hydraulic components.

It should be noted that the timing device 40 could include its own return spring analogous to the spring 48 included in the normally closed valve 16. Such a spring could be mounted within the second subchamber 58 or between the push button 42 and the end cap 61a of cylinder 52.

The operation of the cleaning system 10 can now be described. When it is necessary to fill the sink 30 with a new charge of water and liquid detergent solution, the appropriate amount of water can be metered in by opening the main water valve 34 for a set period of time or by filling the sink 30 to a predetermined level. The proper amount of liquid detergent solution can then be metered in by manually engaging the push button 42. This causes the piston 54 to pressurize the timing fluid within the second subchamber 58. The pressurized fluid flows through by-pass line 66 and (primarily) through check valve 70 into the first subchamber 56, and this allows the piston 54 to proceed from its first position or state (shown in FIG. 2) to its second position or state (shown in FIG. 3). This in turn causes the end of the rod 60 to apply pressure to valve stem 50 so as to move the plug 46 out of engagement with the valve seat 44, thus opening the valve 16 (as shown in FIG. 3). The valve 16 is therefore closed when the piston 54 is in its first state and open when the piston 54 is in its second state.

Once the push button 42 is released, the spring 48 will urge the valve stem 50 against the rod 60 which in turn causes the piston 54 to pressurize the timing fluid within the first subchamber 56. The pressurized timing fluid proceeds through the adjustable orifice 72 and through the by-pass line 66 into the second subchamber 58. This allows the piston 54 and rod 60 to move (upward in FIG. 2) and eventually allows the valve plug 46 to seal against the valve seat 44 after a predetermined period of time.

The orifice 72 can be manipulated to adjust the predetermined period of time that the valve 16 is open. If a longer period of valve opening is desired, the adjustable orifice 72 is further closed so as to present a greater resistance to flow of timing fluid from the first subchamber 56 to the second subchamber 58. On the other hand, if a shorter period of valve opening is required the adjustable orifice 72 is manipulated to further open the orifice, thereby lessening the resistance to flow from the first subchamber 56 to the second subchamber 58.

It should be noted that the normally-closed valve 16 is preferably somewhat non-linear in that it substantially fully opens soon after the rod 60 engages the valve stem 50 and begins to push the plug 46 out of engagement with the seat 44.

It should also be noted that the flow control device 68 could in fact be mounted within the cylinder 52 on or within the piston 54. That is, the check valve 70 and orifice 72 could selectively allow timing fluid to flow through ports in the piston 54. Of course, this might unnecessarily restrict access to the adjustable orifice 72 during adjustment of the predetermined open time for the valve 16.

Finally, it should be noted that the timing fluid is illustrated as being mechanically separate from the solvent in FIGS. 2 and 3. However, it is contemplated that the solvent (e.g., water) itself could serve as the timing fluid. Further, it is envisioned that the solvent could be placed in thermal contact with the cylinder 52 so as to change the viscosity of the timing fluid in inverse proportion to changes in temperature of the solvent. For example, the solvent line 18 or 20 could be coiled about and placed in direct contact with the cylinder 52. Then, if the water temperature increases, the timing fluid would be heated and made less viscous so as to decrease the predetermined period of time that the valve 16 is open. Maintaining the timing fluid thermally and physically separate from the solvent eliminates changes in the period of time that the valve 16 is open due to changes in the pressure or temperature of the solvent.

It should be emphasized that the present invention is not limited to any particular materials or combination of materials, and modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes as presented herein. All alternative modifications and variations of the present invention which fall within the spirit and broad scope of the appended claims are included.

I claim:

1. A detergent dispensing system for reproducibly dispensing a predetermined quantity of detergent derived from a larger detergent source, comprising: an apparatus for placing a liquid solvent supply with a flowline in fluid communication with a solid detergent supply to produce a predetermined amount of liquid detergent solution, further comprising:

(a) a normally closed valve in the solvent flowline controlling fluid communication with the solid detergent supply, said valve controlling flow of solvent through the flowline to said detergent supply and having an open state and a closed state;

(b) timing means operatively connected to the valve for selectively activating the valve to change it from its closed state to its open state and for maintaining the valve in its open state for a predetermined period of time, the timing means comprising:

(i) a chamber containing a timing fluid;

(ii) a movable piston in substantially sealing engagement within the chamber having a first state and a second state, said movable piston forming a first subchamber and a second subchamber, the first subchamber and the second subchamber being of relatively equal volumetric capacity, such that the movable piston travels over a relatively small proportion of the chamber when transitioning from the first state to the second state;

(iii) an external flowpath including a check valve in fluid communication with the subchambers for substantially freely permitting flow of timing fluid from the second subchamber to the first subchamber and for substantially preventing flow of timing fluid from the first subchamber to the second subchamber;

(iv) adjustable restriction means defining a bypass for the check valve in fluid communication with the flowpath in parallel with the external check valve for adjustably restricting the flow of timing fluid from the first subchamber to the second subchamber, wherein the movable piston is substantially freely selectively moved by a first piston rod segment and actuator extending from the piston to externally of the chamber from its first state to its second state due to the substantially free flow of timing fluid from the second subchamber to the first subchamber by the opening of the check valve, but wherein the movable piston resists movement from its second state to its first state due to the restricted flow of timing fluid through the bypass from the first subchamber to the second subchamber; and (v) a second segment of piston rod extending in an opposite direction from said piston than said first segment for connecting the valve to the piston, said first and second segments comprising a rod of differing diameter such that the rod first segment will abut the chamber to define a stop of the movable piston, wherein when the piston is in the first state the valve is closed; and when the piston is in the second state the valve is open;

(c) means for biasing the movable piston and external of the housing for urging the movable piston from its second state to its first state, wherein the timing means is activated by pushing the movable piston through the actuator from its first state to its second state, and wherein the biasing means causes the movable piston to move from its second state to its first state in a predetermined period of time, wherein the predetermined period of time that the valve is open is a result of the rate of flow of timing fluid from the first subchamber to the second subchamber through the restriction, wherein a higher rate of flow of timing fluid through the restriction is associated with a shorter predetermined period of time and a lower rate of flow is associated with a longer predetermined period of time; and (d) said solvent supply placing a portion of the detergent from the solid detergent supply in fluid solution with the predetermined amount of solvent, whereby the predetermined amount of liquid detergent solution is produced and dispensed to a point of use.

2. The detergent dispensing system of claim 1, wherein the actuator includes a push button.

3. The detergent dispensing system of claim 1, wherein the adjustable restriction means includes a conduit having an orifice which is adjustable in size.

4. The detergent dispensing system of claim 1, wherein the timing fluid is a viscous oil.

5. The detergent dispensing system of claim 1, wherein the biasing means comprises a spring.

6. The detergent dispensing system of claim 5, wherein the spring is operatively attached to a plug of the normally closed valve.

7. A detergent dispensing system for reproducibly dispensing a predetermined quantity of detergent derived from a larger detergent source, comprising: an apparatus for placing a liquid solvent supply with a flowline in fluid communication with a solid detergent supply to produce a predetermined amount of liquid detergent solution, further comprising:

(a) a normally closed valve in the solvent flowline controlling fluid communication with the solid detergent supply, said valve controlling flow of solvent through the flowline to said detergent supply and having an open state and a closed state;

(b) timing means operatively connected to the valve for selectively activating the valve to change it from its closed state to its open state and for maintaining the valve in its open state for a predetermined period of time, the timing means comprising:
(i) a chamber containing a timing fluid;
(ii) a movable piston in substantially sealing engagement within the chamber having a first state and a second state, said movable piston forming a first subchamber and a second subchamber, the first subchamber and the second subchamber being of relatively equal volumetric capacity, such that the movable piston travels over a relatively small proportion of the chamber when transitioning from the first state to the second state;
(iii) an external flowpath including a check valve in fluid communication with the subchambers for substantially freely permitting flow of timing fluid from the second subchamber to the first subchamber and for substantially preventing flow of timing fluid from the first subchamber to the second subchamber;
(iv) adjustable restriction means defining a bypass for the check valve in fluid communication with the flowpath in parallel with the external check valve for adjustably restricting the flow of timing fluid from the first subchamber to the second subchamber, wherein the movable piston is substantially freely selectively moved by a first piston rod segment and actuator extending from the piston to externally of the chamber from its first state to its second state due to the substantially free flow of timing fluid from the second subchamber to the first subchamber by the opening of the check valve, but wherein the movable piston resists movement from its second state to its first state due to the restricted flow of timing fluid through the bypass from the first subchamber to the second subchamber; and
(v) a second segment of piston rod extending in an opposite direction from said piston than said first segment for connecting the valve to the piston, wherein when the piston is in the first state the valve is closed; and when the piston is in the second state the valve is open;

(c) means for biasing the movable piston and external of the housing for urging the movable piston from its second state to its first state, wherein the timing means is activated by pushing the movable piston through the actuator from its first state to its second state, and wherein the biasing means causes the movable piston to move from its second state to its first state in a predetermined period of time, wherein the predetermined period of time that the valve is open is a result of the rate of flow of timing fluid from the first subchamber to the second subchamber through the restriction, wherein a higher rate of flow of timing fluid through the restriction is associated with a shorter predetermined period of time and a lower rate of flow is associated with a longer predetermined period of time; and (d) said solvent supply placing a portion of the detergent from the solid detergent supply in fluid solution with the predetermined amount of solvent, whereby the predetermined amount of liquid detergent solution is produced and dispensed to a point of use.

8. The detergent dispensing system of claim 7, wherein the actuator includes a push button.

9. The detergent dispensing system of claim 7, wherein the adjustable restriction means includes a conduit having an orifice which is adjustable in size.

10. The detergent dispensing system of claim 7, wherein the timing fluid is a viscous oil.

11. The detergent dispensing system of claim 7, wherein the biasing means comprises a spring.

12. The detergent dispensing system of claim 11, wherein the spring is operatively attached to a plug of the normally closed valve.

13. A detergent dispensing system for reproducibly dispensing a predetermined quantity of detergent derived from a larger detergent source, comprising: an apparatus for placing a liquid solvent supply with a flowline in fluid communication with a solid detergent supply to produce a predetermined amount of liquid detergent solution, further comprising:
   (a) a normally closed valve in the solvent flowline controlling fluid communication with the solid detergent supply, said valve controlling flow of solvent through the flowline to said detergent supply and having an open state and a closed state;
   (b) timing means operatively connected to the valve for selectively activating the valve to change it from its closed state to its open state and for maintaining the valve in its open state for a predetermined period of time, the timing means comprising:
      (i) a chamber containing a timing fluid;
      (ii) a movable piston in substantially sealing engagement within the chamber having a first state and a second state, said movable piston forming a first subchamber and a second subchamber, the first subchamber and the second subchamber being of relatively equal volumetric capacity, such that the movable piston travels over a relatively small proportion of the chamber when transitioning from the first state to the second state;
      (iii) an external flowpath including a check valve in fluid communication with the subchambers for substantially freely permitting flow of timing fluid from the second subchamber to the first subchamber and for substantially preventing flow of timing fluid from the first subchamber to the second subchamber;
      (iv) restriction means defining a bypass for the check valve in fluid communication with the flowpath in parallel with the external check valve for restricting the flow of timing fluid from the first subchamber to the second subchamber, wherein the movable piston is substantially freely selectively moved by a first piston rod segment and actuator extending from the piston to externally of the chamber from its first state to its second state due to the substantially free flow of timing fluid from the second subchamber to the first subchamber by the opening of the check valve, but wherein the movable piston resists movement from its second state to its first state due to the restricted flow of timing fluid through the bypass from the first subchamber to the second subchamber; and
      (v) a second segment of piston rod extending in an opposite direction from said piston than said first segment for connecting the valve to the piston said first and second segments comprising a rod of differing diameter such that the rod first segment will abut the chamber to define a stop of the movable piston, wherein when the piston is in the first state the valve is closed; and when the piston is in the second state the valve is open;
   (c) means for biasing the movable piston and external of the housing for urging the movable piston from its second state to its first state, wherein the timing means is activated by pushing the movable piston through the actuator from its first state to its second state, and wherein the biasing means causes the movable piston to move from its second state to its first state in a predetermined period of time, wherein the predetermine period of time that the valve is open is a result of the rate of flow of timing fluid from the first subchamber to the second subchamber through the restriction, wherein a higher rate of flow of timing fluid through the restriction is associated with a shorter predetermined period of time and a lower rate of flow is associated with a longer predetermined period of time; and
   (d) said solvent supply placing a portion of the detergent from the solid detergent supply in fluid solution with the predetermined amount of solvent, whereby the predetermined amount of liquid detergent solution is produced and dispensed to a point of use.

14. The detergent dispensing system of claim 13, wherein the actuator includes a push button.

15. The detergent dispensing system of claim 13, wherein said restriction means are adjustable.

16. The detergent dispensing system of claim 13, wherein the timing fluid is a viscous oil.

17. The detergent dispensing system of claim 13, wherein the biasing means comprises a spring.

18. The detergent dispensing system of claim 17, wherein the spring is operatively attached to a plug of the normally closed valve.

* * * * *